United States Patent
Giannopoulos et al.

(10) Patent No.: US 6,504,321 B2
(45) Date of Patent: Jan. 7, 2003

(54) UNIVERSAL HARDWARE/SOFTWARE FEEDBACK CONTROL FOR HIGH-FREQUENCY SIGNALS

(75) Inventors: Demetri Giannopoulos, Norwalk, CT (US); Ihor Wacyk, Briarcliff Manor, NY (US); Shenghong Wang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/777,275

(22) Filed: Feb. 6, 2001

(65) Prior Publication Data

US 2002/0107584 A1 Aug. 8, 2002

(51) Int. Cl.⁷ .................................................. G05F 1/00
(52) U.S. Cl. ....................................................... 315/291
(58) Field of Search ................................. 315/291, 293, 315/294, 295, 316, 307, DIG. 4

(56) References Cited

U.S. PATENT DOCUMENTS

| 5,691,604 A | * | 11/1997 | Vijanent | 315/291 |
| 6,107,754 A | * | 8/2000 | Kim | 315/291 |
| 6,188,181 B1 | * | 2/2001 | Sinha et al. | 315/293 |
| 6,204,673 B1 | * | 3/2001 | Andeen et al. | 324/725 |
| 6,337,544 B1 | * | 2/2002 | Wang et al. | 315/291 |

* cited by examiner

Primary Examiner—Don Wong
Assistant Examiner—Minh D A
(74) Attorney, Agent, or Firm—Steven R. Biren

(57) ABSTRACT

A method and apparatus for providing closed loop feedback control is presented. The method consists of a hybrid software and hardware solution to take advantage of the useful attributes of both. Analog signals output by the device are sampled at a rate sufficient to preserve all necessary high frequency information, and preprocessed at high speed in hardware. The outputs of the preprocessing stage are then operated on in software at much lower speeds. The method and apparatus allow for the complex real time processing of feedback signals in the digital domain, yet allow the cost efficiencies and programming flexibility of a standard microcontroller to be utilized.

20 Claims, 3 Drawing Sheets

UNIVERSAL HARDWARE/SOFTWARE FEEDBACK CONTROL FOR HIGH-FREQUENCY SIGNALS

TECHNICAL FIELD

This invention relates generally to a method and apparatus for providing closed loop feedback control for a circuit. This invention has particular application in the feedback control of high-frequency switching mode power converters used in lighting applications.

BACKGROUND OF THE INVENTION

Future intelligent power management systems for lighting applications will require electronic ballasts with network control and communications capabilities. As well, the emerging electronic ballast must be universal. It must be able to drive different lamp types as well as operate globally, i.e., be interoperable with differing AC line voltages.

An electronic ballast drives a lamp with a nearly sinusoidal wave of a particular frequency. The driving pulse output by the ballast is generally a combination of one or more outputs of a switching-mode power converter, such as, e.g., a half-bridge power converter. These power-converter outputs are generally square waveforms, but before being applied to the lamp, are passed through an LC tank, resulting in near sinusoidal waveforms applied to the lamp.

The output signals of switching-mode power converters used in lamp driving circuits are periodic waveforms whose frequencies are equal to the switching frequency of the converters. The width and frequency of these output signals govern the intensity, and therefore the power, delivered to the lamp. In order to properly regulate the output signals of these switching-mode power converters a closed feedback loop is required. The feedback loop is used to continually communicate back to the electronic ballast the voltage across and current through the lamp so that the output voltage wave from the ballast can be continually controlled.

In a universal ballast, the control should be flexible and programmable. A ballast should be able to calculate, for example, at least real lamp power, average rectified lamp current or rectified lamp voltage. Accordingly, the ideal ballast should be programmable so as to implement various control mechanisms, such as lamp current regulation, lamp voltage regulation, real-power regulation, or a combination of these control methods. Such flexibility supports driving various lamp types, a feature which is more and more an important functionality in the ballast marketplace.

Unfortunately, current ballast control systems are either inflexible and non-universal, or programmable, but unable to provide real time control. Current feedback loops in power converters are mostly implemented in analog hardware. They therefore comprise numerous discrete components such as resistors, capacitors, operational amplifiers, comparators, and analog integrated circuit controllers. Such feedback loop implementations are necessarily hardwired, and thus not at all programmable.

The other approach taken in existing feedback power converter control for electronic ballasts is the use of a low-cost microcontroller based integrated circuit which includes a low speed analog to digital converter for digitizing the analog input signals. Such a system is depicted in FIG. 1, operating on two feedback signals A 101 and B 102. These analog input signals A 101 and B 102 are generally the voltage and current signals coming from the lamp. The sampling speed of these analog lamp signals must be kept low in such an approach, due to the limited processing speed of the standard micro-controller. As a result, in order to send low speed digitized signals to the microcontroller to be operated upon by a micro-processor implemented control algorithm, the bandwidth of the feedback signals must be significantly reduced. In order to achieve this reduction of bandwidth, the high frequency analog signals coming from the lamp must first be processed by analog low pass filters prior to their being digitized by a low speed analog to digital converter. Such low pass filters are depicted as LPF 105 and LPF 106, respectively. Once the bandwidth has been limited by the analog filters, the low frequency signals 107 and 108, respectively, can be converted to the digital domain by the analog to digital converters 110 and 111, respectively. Once digitized at the low sampling speed, the signals are fed into a micro-controller 115, which operates upon them and generates thereby control signals which are sent to the pulse width modulator 120 which drives the lamp.

There are significant problems inherent in each of the two above-described approaches. The feedback implementation in analog hardware includes several discrete components. The more components there are, the greater the cost; both in terms of actual components as well as in terms of manufacture, design, compatibility, and testing considerations. Furthermore, a pure hardware analog feedback implementation will be limited to a particular application to insure stable operation. Since the processing of the analog signals that can be done is in no way programmable when using discrete analog components, the optimal feedback loop for a given application will only optimally work for that one application. Flexibility is lost. This simply does not work for applications such as universal ballasts where the power converter needs to operate with different input voltages and must be able to drive a wide range of possible loads.

Additionally, the complexity of signal processing that can be done with discrete analog components is limited. As well, in truth, analog signal processing in control systems is fast becoming obsolete.

On the other hand, because the output signals of switching-mode power converters are periodic waveforms of frequency equal to the switching frequency of the converters, it is desirable in any optimal feedback control loop to preserve the high frequency information that is contained in these output signals. Lamp signals generally have a basic frequency equal to the switching frequency of the power converter that drives them, as well as numerous higher order harmonic frequencies contained in them. The harmonics present affect the lamp's power. The effects of higher order harmonics increase in proportion to the lamp dimming level. In other words, the lower the power level of the lamp, the more significant the contribution of higher order harmonics. This is generally the case because at low dim levels the pulse-width of the square waveform at the half-bridge output is reduced, resulting in increased harmonic content of the signal fed to the low pass filter. Furthermore, the lamp impedance increases at low dimming levels, thus affecting the roll-off of the filter, which in turn results in increased harmonic content of the of the signal directly driving the lamp.

To preserve the information contained in the higher order harmonics, a high sampling rate is necessitated. The well known Nyquist Sampling Theorem determines the sampling frequency that must be used to fully characterize continuous time signals by a sequence of discrete samples. The Nyquist theorem states that the sampling frequency must be at least twice as high as the maximum signal frequency.

If a microcontroller based integrated circuit feedback loop control implementation is desired to be used, then it is necessary to sample the output of the lamp circuit at twice the highest relevant harmonic of the maximum switching frequency. As an example, if the maximum switching frequency of the lamp is 100 KHz, and due to the required accuracy the effects of the first through fifth harmonics cannot be ignored, the following equation is operative: $f_s \geq 2*5*f_{HB}$, i.e., the sampling frequency $f_s$ must equal or exceed twice the fifth harmonic (or 10X) of the base frequency $f_{HB}$, which is the half-bridge switching frequency. In the above described example, where the maximum frequency of the lamp is 100 KHz, the sampling frequency must therefore be higher than 1 MHz.

On the other hand, if the maximum switching frequency is 100 KHz, and the information contained in the $16^{th}$ order harmonic cannot be ignored based upon the accuracy requirements of the control algorithm, then the sampling frequency must be greater than or equal to 3.2 MHz. The standard microcontrollers generally used in state of the art microcontroller based feedback control loops, such as, for example, the Intel 80C51, simply cannot process samples at such a high rate.

As a result of the foregoing discussion, clearly a significant need exists in the art for a feedback control loop implementation for an electric lamp which can provide both the programmable flexibility and real time complex signal processing capability of a software solution operating on digitized signals, with the immediacy and speed that can only be currently achieved using a dedicated analog hardware implementation.

SUMMARY OF THE INVENTION

The above-described shortfalls of the prior art are overcome in accordance with the teachings of the present invention which relates to an apparatus and method for providing feedback loop control for a circuit in real time by means of a hybrid software and hardware solution. In a preferred embodiment, this circuit is used in a digital electronic ballast controlling electric lighting, where a closed feedback loop is utitlized to control a high frequency power converter. While such a power converter is frequently a half-bridge converter used with fluorescent lamps, the invention can easily be expanded to a full-bridge power converter circuit used for controlling HID lamps. In either case the driving output is an AC pulse train.

The feedback signals running from the circuit output to the controller are preprocessed in specialized hardware, and then output to a processor. The processor operates upon the signals input to it according to a control algorithm implemented in software.

DETAILED DESCRIPTION OF THE PREFERRED EMBODIMENT

Figure 1:
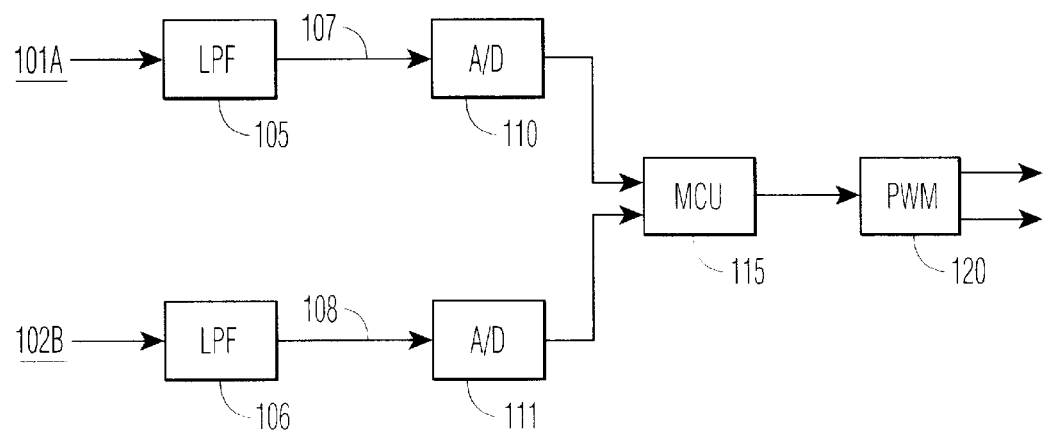
FIG. 1 depicts a state of the art microcontroller based feedback loop implementation.
Figure 2:
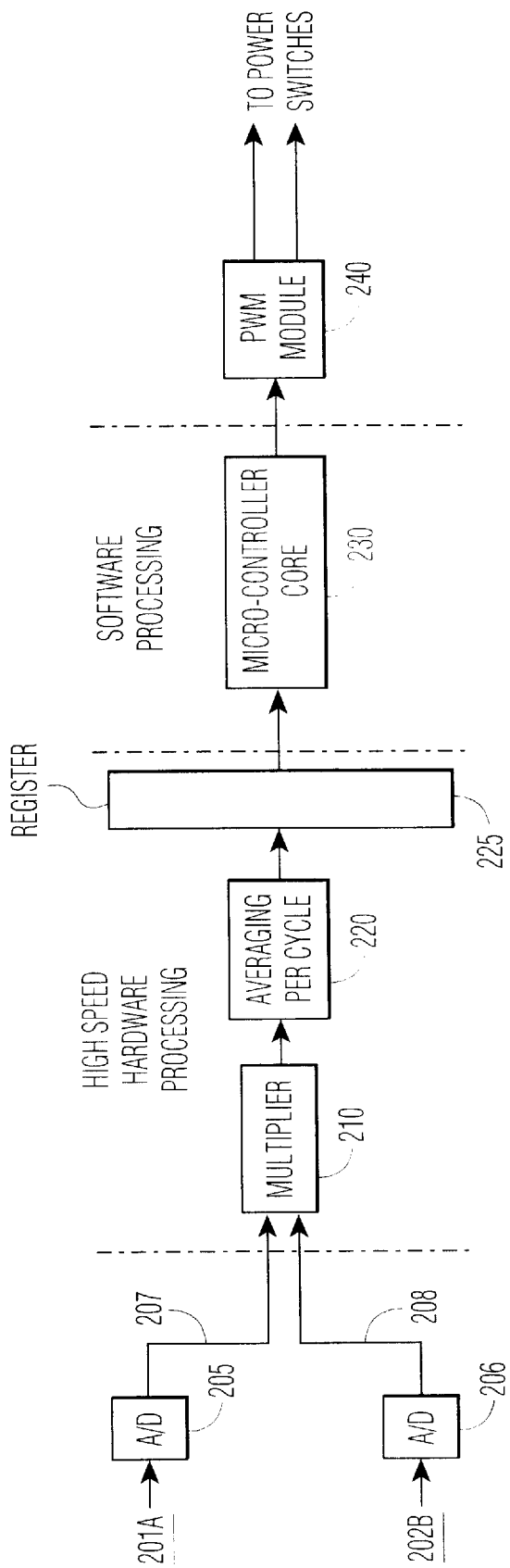
FIG. 2 shows an exemplary circuit implementing the present invention.

The preferred embodiment of the invention will now be described with reference to FIGS. 2 and 3. For purposes of illustration the preferred embodiment will be described as having a control algorithm which operates upon lamp power. There are various types of control algorithms available which can provide adequate and accurate feedback loop control to regulate the output signals of switching-mode power converters, and they can, for example, be voltage based, current based, power based or some combination of the above. As well, other circuit parameters can be the operand(s) of the control algorithm. For purposes of this description of the preferred embodiment, with reference to FIG. 2, the input analog signals A 201 and B 202, respectively, refer to the voltage and current signals coming from the lamp.

The analog feedback signals A 201 and B 202 coming from the lamp are sampled and thereby digitized by passing them through analog to digital converters 205 and 206, respectively. In the method and apparatus of the present invention the sampling rate used in these analog to digital converters is programmable. Thus, depending on the accuracy requirements of the lamp, the maximum switching frequency used by the power converter in the electronic ballast, and the harmonics of such maximum switching frequency which must be considered to comply with the required accuracy requirements of the control algorithm, a sampling rate can be user calculated.

The output of the analog to digital converters 205 and 206, being the sequence of quantized samples of the original analog signals, is fed into a multiplier unit 210. The multiplier, in the embodiment described, simply multiplies the voltage signal with the current signal to generate the actual power in the lamp as a function of time. As an example, if the analog signals are sampled using an 8 bit sample, the maximum switching frequency of the power converter driving the lamp is 100 KHz, and the effects of the $16^{th}$ harmonic of the switching frequency must be taken into account given the accuracy required, the sampling ratio will need to be set to 32 times the base frequency or result in a sampling frequency of 3.2 MHz, and the incoming data stream will be 25.6 Mbits/sec. This data stream must undergo 8 bit multiplications in real time, which is obviously beyond the ability of standard low-cost microcontrollers. For this reason the high speed multiplication is done in dedicated DSP hardware, i.e., the multiplier 210.

Figure 3:
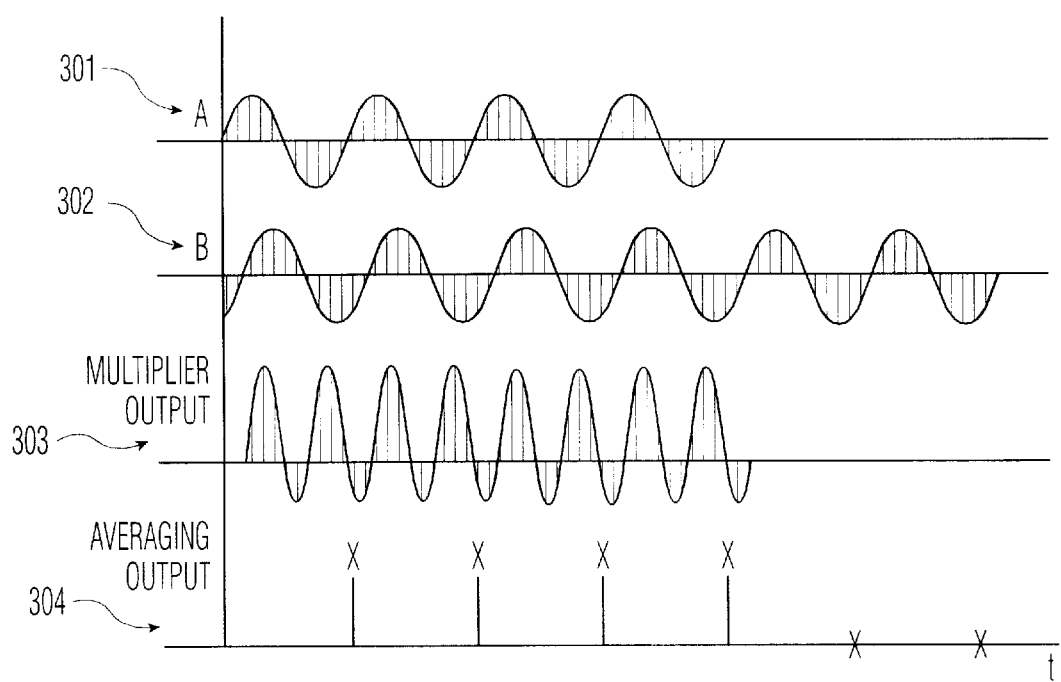
FIG. 3 depicts plots of amplitude versus time for various input, intermediate and output signals generated according to the method of the present invention.

Because the real power is calculated by the high speed digital signal processing hardware, the multiplier 210 simply multiplies the sampled voltage and sampled current signals and produces a multiplier output consisting of a sequence of digital samples as is shown in the third plot of FIG. 3, labeled "MULTIPLIER OUTPUT" 303. The multiplier output consists of a sequence of digital samples propagating at the same sampling rate as the digitized signals 207 and 208 which were the respective outputs of the analog to digital converters 205 and 206. Because this data rate, as above, is much higher than the standard low-cost microcontroller, such as the Intel 8051 and the like, can process, before the product (of voltage and current) data stream, being the digitzed instantaneous power in the lamp, can be processed by the microcontroller 230, it must be slowed down. This is accomplished by averaging, done by the averager 220, and the averaged output is ultimately input to the microcontroller 230. The microcontroller 230 implements the control algorithm which, in this example, operates on the lamp power. The output of the averaging module is shown, with reference to FIG. 3, as the bottom plot, entitled "AVERAGING OUTPUT". As can readily be seen, the sample rate of the averager output is much less than the original sampling frequency utilized in the analog to digital converters 205 and 206. Obviously, the averaging output sample rate is programmable and can be varied as necessary or desired to interface with the software implemented control algorithm for real time control. In FIG. 3, the averager output 304 was arrived at by using a down sampling ratio of 16, so as to return to the original switching frequency of the lamp, and is therefore equal to the frequency of the original analog signals A 301 and B 302.

The output of the averaging module 220 is next fed into a register 225, which is accessed and read from by the microcontroller 230. The microcontroller 230, operating at the lower sample rate on the averaging output 304 (as shown in FIG. 3) can thus be a commonly available, low-cost, low-power microcontroller. The microcontroller operates on its input data stream according to the control algorithm, and sets the poles and zeros of the feedback loop. Ultimately, the microcontroller output is taken as input by the Pulse Width Modulation module 240, which regulates the width and frequency of the voltage pulses delivered to the lamp.

While the foregoing describes the preferred embodiment of the invention, it is understood by those of skill in the art that various modifications and variations may be utilized, such as, for example, using the invention in circuits that have any waveform as driving outputs, both ac and dc, and the extension of the circuit of the preferred embodiment to any number of output signals, each with one or more hardware and software data sources. Additionally, given this flexibility, the control algorithm can operate on any number of inputs, and calculate a wide range of intermediate signals to be fed to a processor implementing a control algorithm. Such modifications are intended to be covered by the following claims.

What is claimed:

1. A method of providing feedback control to a circuit driving a lamp, comprising:
   digitizing feedback signals from said lamp to produce corresponding digital signals of a first sample rate higher than a maximum data processing rate of a micro-processor;
   multiplying said digital signals to generate a multiplied digital signal;
   averaging said multiplied digital signal to a digital signal of a second sample rate within said maximum data processing rate of said microprocessor; and
   processing said digital signal of said second rate by implementing a control algorithm at said microprocessor.

2. The method of claim 1 wherein said feedback signals comprises a voltage across and a current through said lamp.

3. The method of claim 1 wherein said feedback signals comprises high frequency components, and wherein said first sample rate is high enough to preserve all required high frequency information.

4. The method of claim 1 wherein said multiplying is done by a multiplier implemented as hardware.

5. The method of claim 1 wherein said processing is done in real time.

6. A method of providing feedback control comprising:
   digitizing one or more feedback signals of a first sample rate higher than a maximum data processing rate of a microprocessor;
   preprocessing said digitized signals to generate a preprocessed digital signal of a second sample rate within said maximum data processing rate of said micro-processor; and
   processing said preprocessed digital signal of said second rate by implementing a software control algorithm at said microprocessor.

7. The method of claim 6 wherein said preprocessing is implemented by hardware.

8. The method of claim 6 wherein said preprocessing comprising averaging a signal of said first sample rate to a signal of said second rate.

9. The method of claim 6 wherein said preprocessing comprising multiplying said digitized signals of said first sample rate to a multiplied signal.

10. The method of claim 9 wherein said multiplying is done by a multiplier implemented in hardware.

11. The method of claim 6 wherein said first sample rate is high enough to protect all required high frequency information contained in said feedback signals.

12. The method of claim 11 wherein said first sample rate for digitizing said feedback signals is programmable.

13. The method of claim 8 wherein said second sample rate by said averaging is programmable.

14. The method of claim 6 wherein said feedback signals comprises a voltage across and a current though a lamp.

15. The method of claim 14 wherein said software control algorithm is one for controlling a ballast circuit driving said lamp.

16. Apparatus for providing feed back control comprising:
   analog to digital converters for digitizing feedback signals at a first sample rate;
   means for preprocessing said digitized signals of said first sample rate to generate a preprocessed signal of a second sample rate; and
   a microprocessor for operating upon said preprocessed signal by implementing a software control algorithm;
   wherein said first sample rate is higher than a maximum data processing rate of said microprocessor, and said second sample rate is within said maximum data processing rate of said microprocessor.

17. The apparatus of claim 16 wherein said preprocessing means is implemented in hardware.

18. The apparatus of claim 16 wherein said preprocessing means comprises an averaging module for averaging a signal of said first sample rate to a signal of said second sample rate.

19. The apparatus of claim 16 wherein said feedback signals comprise a voltage across and a current through a lamp.

20. The apparatus of claim 19 wherein said preprocessing means comprising a multiplier implemented in hardware for multiplying said digitized feedback signals.

* * * * *